Figure 1:
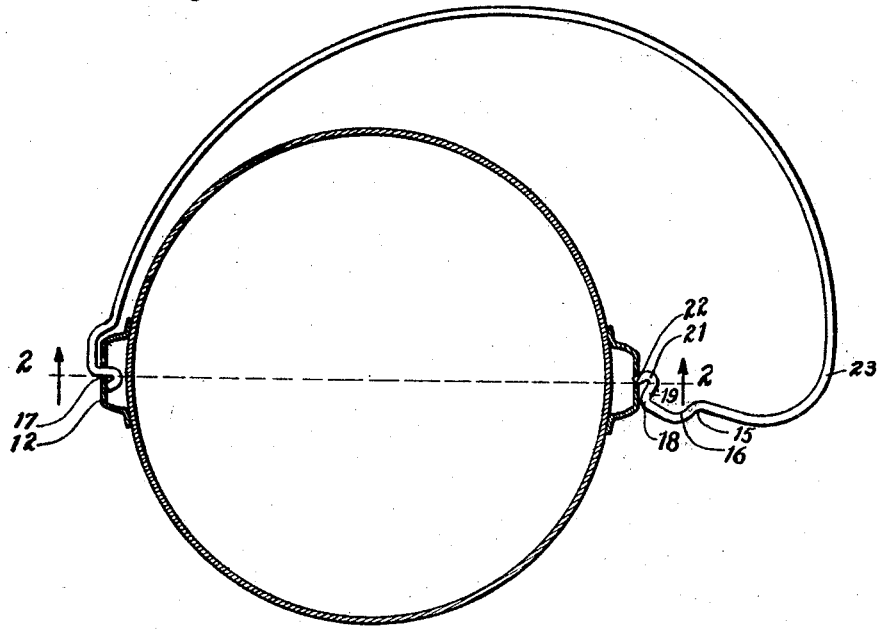

March 2, 1926.

J. M. HOTHERSALL

BAIL 1,575,266

Original Filed August 9, 1920

Inventor:
John M. Hothersall
By: Munday, Clarke &
Carpenter. Attys.

Patented Mar. 2, 1926.

1,575,266

UNITED STATES PATENT OFFICE.

JOHN M. HOTHERSALL, OF BROOKLYN, NEW YORK, ASSIGNOR TO AMERICAN CAN COMPANY, OF NEW YORK, N. Y., A CORPORATION OF NEW JERSEY.

BAIL.

Application filed August 9, 1920, Serial No. 402,333. Renewed July 20, 1925.

*To all whom it may concern:*

Be it known that I, JOHN M. HOTHERSALL, a citizen of the United States, residing in Brooklyn, in the county of Kings and State of New York, have invented a new and useful Improvement in Bails, of which the following is a specification.

My invention relates in general to bails for pails, buckets, and the like, and more particularly to means for engaging and retaining the ends thereof in bail ears attached to the sides of the receptacle.

A principal object of my present invention is the provision of a bail and bail ear connection which will be from all practical standpoints indestructible in service and which will remain operative when the bail is distorted in various ways, and permit of the rebending of the bail, after distortion, to accurate shape without danger of destroying the bail ear connection.

A further object of the invention is the provision of such a bail which may be easily attached by hand, and the ends of which may be bent to the desired form, to be hereinafter described, before the bail is secured upon the bucket, requiring no reforming thereafter.

A still further object of the invention is the provision of a bail which is at once capable of attachment to a receptacle without possible injury to any of the parts thereof, and incapable of removal without damaging the bail or the engaging ears. There is considerable difficulty in practice with many types of bails by reason of the fact that they often jar or are forced out of position during handling of the bucket or receptacle. To meet this difficulty, I have provided a means for locking the bail in place so that after assembly such accidental removal is prevented.

Numerous other objects and advantages of the invention will be apparent as it is better understood from the following description when considered in connection with the accompanying drawing illustrating a preferred embodiment thereof.

Figure 2:
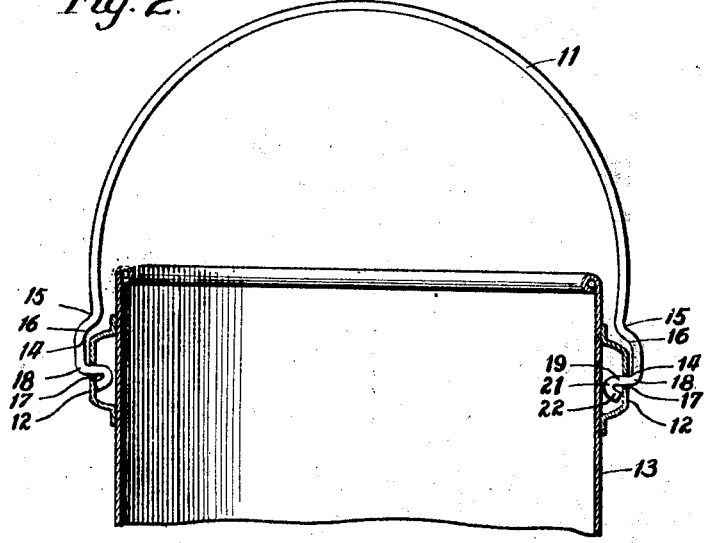

Referring to the drawings,

Figure 1 is a top view of a pail or bucket provided with a bail illustrating my invention; and Fig. 2 is a sectional view taken upon the line 2—2 in Fig. 1, and showing the bail in completely assembled position.

A preferred embodiment of my invention which I have chosen for purposes of illustration comprises a bail 11 engaged in bail ears attached on opposite sides of the upper portion of the pail body 13. The bail end portions designated generally by the reference character 14 are similarly bent to desired form prior to being secured upon the pail.

Said form consists of a bend 15 and a bend 16 which bring the bail outwardly and downwardly over the exterior of the bail ear and in general conformity with the shape thereof to a point opposite an aperture 17 in said ear. At this point there is another bend 18 providing a substantially horizontal portion 19 which is designed to seat in the aperture 17.

Still another bend 21 brings the extreme end 22 back toward the interior surface of the ear, forming a hook of such shape that after the bail is once attached it is practically impossible to remove it.

In order to provide an easy method of assembly, the bail may be bent at a distance from one end as shown at 23 in such manner as to permit the insertion of the hook at that end into the aperture of one ear after the other hook has been placed in normal position in the other ear.

To accomplish this the bend 23 may be gradually removed after the extreme end 22 has entered the aperture thus progressively bringing the hook into locked position. After the bail has been reformed to its normal curve it is permanently and safely secured upon the pail.

The bails may be furnished to the trade with the bend 23 already formed, or they may be furnished in normal shape, it being entirely practical for the user to form said bend by hand at the time of attaching the bail.

It is thought that the invention and many of its attendant advantages will be understood from the foregoing description, and it will be apparent that various changes may be made in form, construction, and arrangement of the parts without departing from the spirit and scope of the invention or sacrificing all of its material advantages, the form hereinbefore described being a preferred embodiment thereof.

I claim:

1. A bail for pails, buckets and the like having at each end a substantially horizontal pivot portion adapted to extend through the opening of a bail ear and having therebeyond a downwardly extending return part arranged at an acute angle with the horizontal pivot portion and adapted to extend back toward the material of the bail ear embracing said pivot portion, one of the arms of said bail having an inward bend 23 at a distance from said pivot portion.

2. A bail for pails, buckets and the like, having at each end a pivot portion adapted to extend inward through the opening of a bail ear, and having therebeyond a downwardly and outwardly extending return part 22, to allow the extreme end of the bail to be first inserted through the ear and then to abut against the inner side of the bail ear which embraces said pivot portion.

JOHN M. HOTHERSALL.